United States Patent
Gregg

[11] 3,921,752
[45] Nov. 25, 1975

[54] MULTI CUSHION FLEXIBLE SUPPORT BAG WITH SURFACE PRESSURE VALVING FOR AIR CUSHION VEHICLE APPLICATION

[76] Inventor: Dwain G. Gregg, Rte. 1, Senecaville, Ohio 43780

[22] Filed: Aug. 26, 1974

[21] Appl. No.: 500,789

[52] U.S. Cl. ............ 180/125; 214/1 BE; 180/119; 180/127
[51] Int. Cl.² ............................................. B60V 1/11
[58] Field of Search ........... 180/116, 117, 118, 119, 180/123, 124, 125, 127, 128, 129; 214/1 BE

[56] References Cited
UNITED STATES PATENTS

| | | | |
|---|---|---|---|
| 3,139,947 | 7/1964 | Beardsley | 180/128 |
| 3,251,431 | 5/1966 | Mackie | 180/124 |
| 3,283,920 | 11/1966 | Schonfelder et al. | 214/1 BE |
| 3,363,718 | 1/1968 | Hammett | 180/128 |
| 3,410,241 | 11/1968 | Hardy et al. | 180/128 |
| 3,628,673 | 12/1971 | Lynn | 214/1 BE |
| 3,826,329 | 7/1974 | Crimmins et al. | 180/125 |
| 3,844,509 | 10/1974 | Jenkins | 180/128 |

Primary Examiner—Robert R. Song
Assistant Examiner—Jack D. Rubenstein
Attorney, Agent, or Firm—R. S. Sciascia; Q. E. Hodges; O. M. Wildensteiner

[57] ABSTRACT

An air cushion vehicle which has means for lubricating its passage over an obstacle. Valves on the surface of the member which encloses the air cushion open on contact with an obstacle and release a lubricating film of air; the film is confined within cells which surround each valve. In one embodiment the cushion is contained within an air filled torous; in another embodiment the vehicle is supported by a bag which underlies the entire vehicle; in a third embodiment the valves are on a conventional skirt.

6 Claims, 9 Drawing Figures

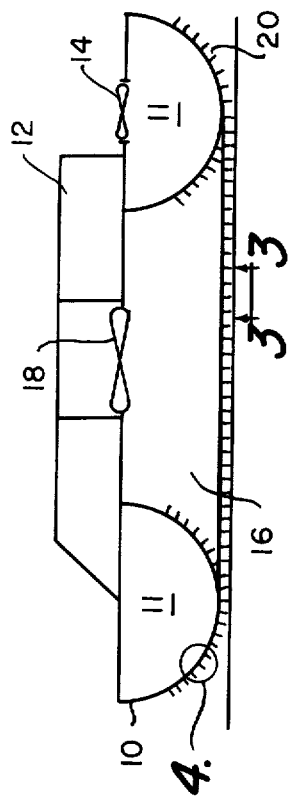
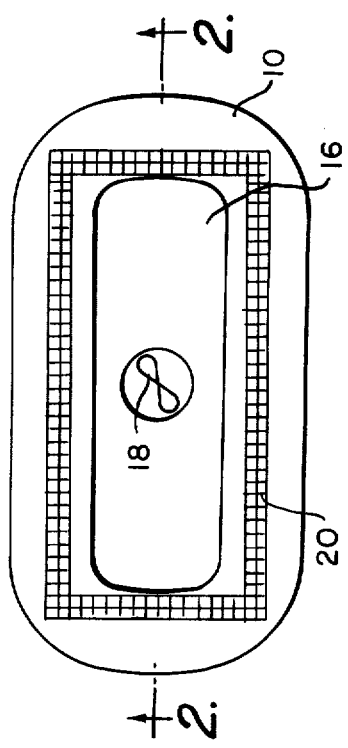
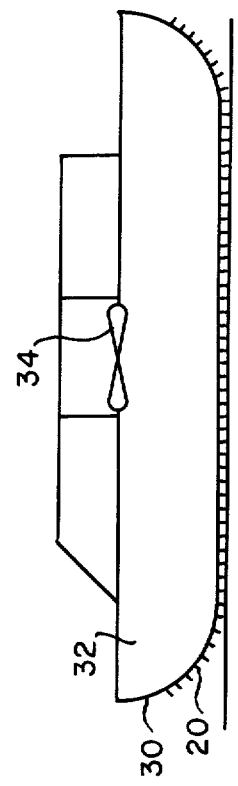
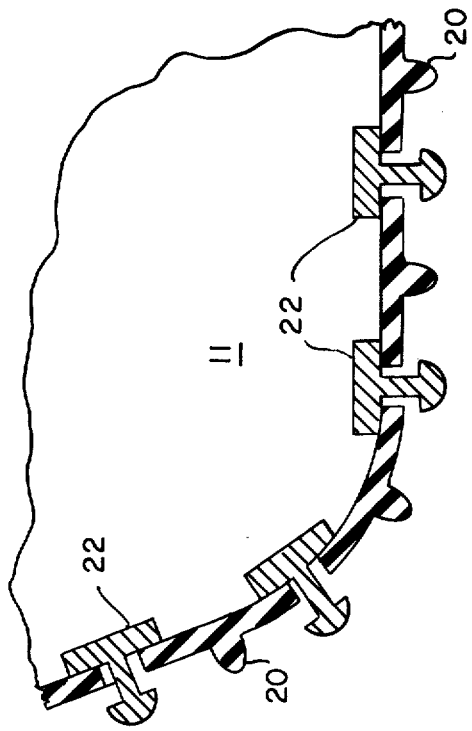

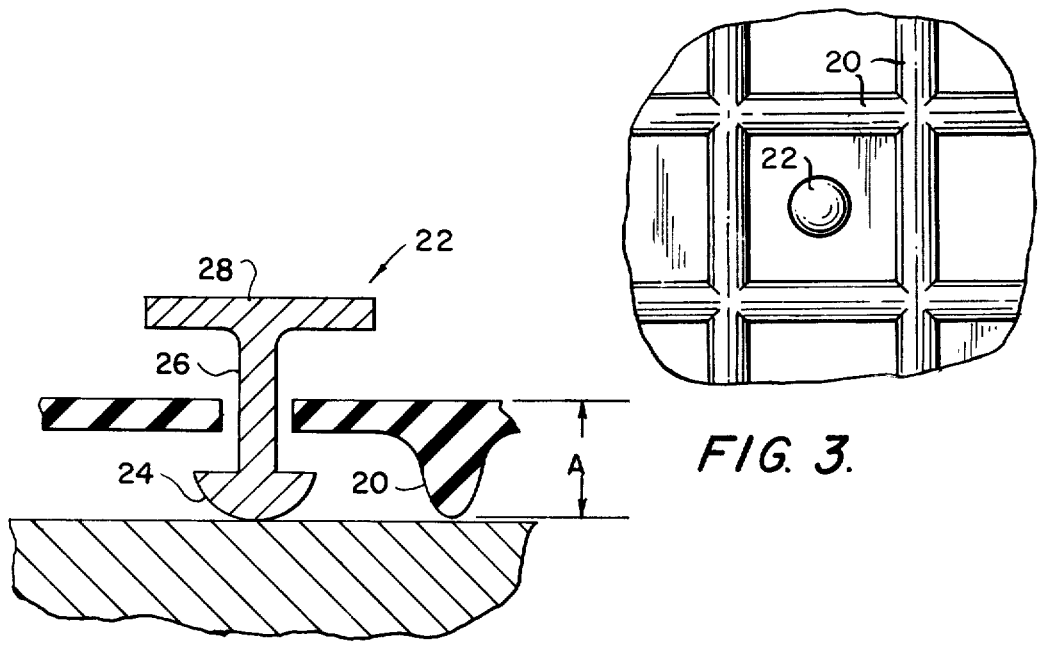
FIG. 3.
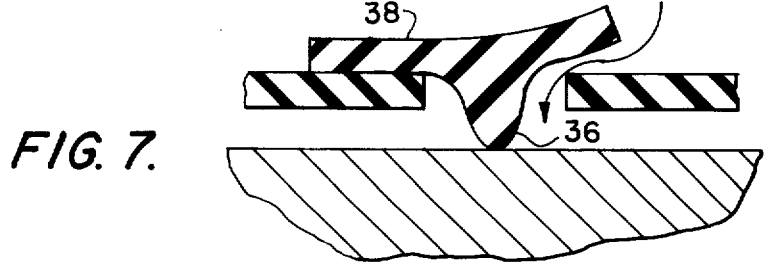
FIG. 6.
FIG. 7.
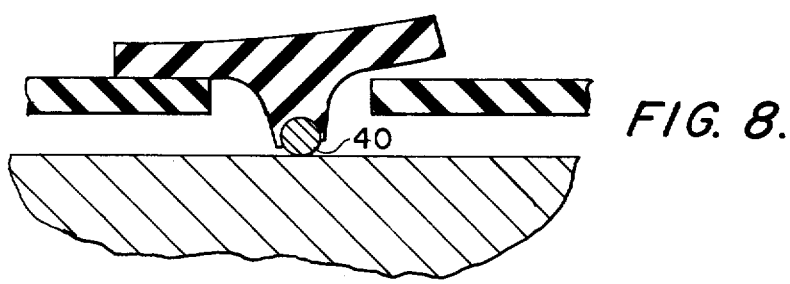
FIG. 8.
FIG. 9.
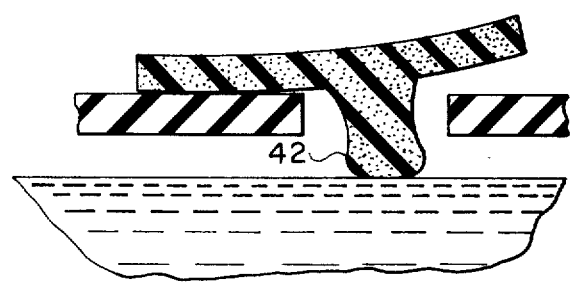

MULTI CUSHION FLEXIBLE SUPPORT BAG WITH SURFACE PRESSURE VALVING FOR AIR CUSHION VEHICLE APPLICATION

The invention described herein may be manufactured and used by or for the Government of the United States of America for governmental purposes without the payment of any royalties thereon or therefor.

BACKGROUND OF THE INVENTION

Air cushion vehicles are supported on a cushion of air which is provided by a plenum chamber underneath the vehicle. The plenum chamber is formed by a skirt which reaches from the vehicle's side down to the ground. A fan within the vehicle forces air into the plenum chamber defined by the skirt, and the vehicle then travels on a cushion of air captured within the skirt.

When the vehicle is traveling over a hard smooth surface, for instance an aircraft runway or a highway, the skirt which defines the chamber is off the ground at substantially all points around the vehicle and air escapes from underneath the skirt at all points. Under these conditions, there is substantially no frictional contact between the vehicle and the ground.

If the vehicle were to travel over a large rock or other obstruction, the skirt at the point where the vehicle passes over the obstruction would come into contact with the obstruction. Since there would be no lubricating film of air between the obstruction and the skirt, the obstruction would exert a frictional drag upon the vehicle. If the vehicle's path contained many such obstructions, the speed of the vehicle would be slowed considerably. Thus the speed of an air cushion vehicle having a conventional skirt is a function of the terrain over which it is traveling, a smoother terrain producing a higher speed.

The present invention is a support member for an air cushion vehicle which provides a lubricating film of air between the support member and any obstructions which the vehicle is traversing.

SUMMARY OF THE INVENTION

Briefly, the present invention is a support member for an air cushion vehicle which is a hollow fluid filled member rather than a conventional skirt. The member is comprised of a flexible material, and has valves on its surface which are opened by contact with the ground. In one embodiment the member takes the form of a toroid which encloses a plenum chamber for a cushion of air as in a conventional vehicle; in another embodiment the member is a flexible bag which underlies the entire vehicle. In both embodiments frictional drag on the support member by an obstruction is reduced by the fact that air is released when the valves on the surface of the member are contacted by the obstruction and which release air.

OBJECTS OF THE INVENTION

Accordingly, it is an object of the present invention to provide an improved air cushion vehicle.

It is a further object of the present invention to provide a support member for an air cushion vehicle which reduces friction between it and an obstruction over which the vehicle is traveling.

It is a further object of the present invention to provide an air cushion vehicle wherein at least a part of the air cushion support is supplied by means other than a conventional plenum chamber.

Other objects and advantages of the present invention will be apparent from the following specification and accompanying drawings.

BRIEF DESCRIPTION OF THE DRAWINGS

FIG. 1 is a bottom view of a vehicle having a toroidal support member according to one embodiment of the present invention.

FIG. 2 is taken on line 2—2 of FIG. 1.

FIG. 3 is taken on line 3—3 of FIG. 2.

FIG. 4 is an enlarged view of the encircled portion of FIG. 3.

FIG. 5 is a cross section view of a vehicle having a bag which underlies the entire vehicle according to a second embodiment of the present invention.

FIGS. 6, 7, 8 and 9 show alternate valve configurations suitable for either embodiment of the present invention.

DESCRIPTION OF THE PREFERRED EMBODIMENTS

FIGS. 1 and 2 show a toroidal support member 10 according to one embodiment of the present invention. Support member 10 is attached to rigid structure 12 of the vehicle around the entire periphery of the vehicle. Support member 10 is supplied with air by fan 14. The area surrounded by support member 10 forms a plenum chamber 16, which is supplied with air under pressure by fan 18. Alternatively, however, both support member 10 and plenum chamber 16 can be supplied with air by a common fan.

The lower portion of support bag 10 has a plurality of walls 20 on it as shown in FIG. 3 which divides the surface into cells. Each cell has a valve 22 within it. Support member 10 is composed of any suitable flexible material such as rubber, plastic, cloth reinforced rubber, or any other material desired.

FIG. 6 shows a poppet valve which can be used in support member 10. It is comprised of a head 24, a stem 26 and a retaining member 28. The valve must be made of a relatively tough material, since head 24 will be in contact with an obstructions encounted as the vehicle travels over the ground. The diameter of head 24 should be only slightly larger than the diameter of the hole in support member 10 in which stem 26 fits; this is because head 24 of the valve is forced through the hole from the inside when the valve is assembled to the support member but the valve should not easily slip through the support member in the reverse direction. The diameter of retainer member 28 must be considerably larger than this hole diameter, since it must keep the valve from being forced out through the support member by air pressure within the support member and also must close off the hole when the valve is out of contact with an obstruction, even when stem 26 is not centered in the hole. The diameter of stem 26 will be selected as a function of the air pressure within support member 10 and the diameter of the hole in support member 10; there must be sufficient clearance between stem 26 and the support member to allow the required air flow through the hole. The length of stem 26 will be determined by dimension A of wall 20 as shown in FIG. 6; when the valve is opened, head 24 and retainer member 28 should be approximately equally spaced on either side of support member 10 as shown.

Operation of the vehicle is as follows. Plenum chamber 16 and chamber 11 within support member 10 are simultaneously pressurized by fans 18 and 14, respectively. Air pressure within chamber 11 closes all of valves 22 as shown in FIG. 4; support member 10 then provides a rigid container for the air within plenum chamber 16. The vehicle is supported on the air cushion within chamber 16 in the conventional manner; air escapes underneath support member 10 in the same manner in which it escapes underneath a conventional skirt. When the vehicle approaches an obstruction, the first part of the vehicle to contact the obstruction will be one of heads 24 of valves 22. When the valve is pushed back into chamber 11, air will escape past stem 26 and pressurize the cell surrounding that particular valve, thereby supplying part of the cushion of air for the vehicle. Air escaping between walls 20 and the obstruction will then lubricate the passage of the support member over the obstruction. In this manner the drag on the vehicle by the obstruction is considerably reduced compared to the drag on a conventional skirt by the same obstruction.

As shown in FIG. 2, valves 22 do not extend over the entire surface of support member 10. Valves 22 extend only to the height of an obstruction over which the vehicle is expected to travel.

A second embodiment of the present invention is shown in FIG. 5 in cross section. In this embodiment the conventional plenum chamber is replaced by a flexible bag 30 which extends under the entire vehicle and which has valves 22 on its surface. Valves 22 and surrounding walls 20 are the same as shown in FIGS. 3 and 4. Chamber 32 within bag 30 is supplied with air under pressure by fan 34.

Operation of this embodiment is as follows. Chamber 32 is pressurized with air, which closes all of valves 22. Those valves which are on the part of the bag which rests on the surface over which the vehicle is traveling, however, will be opened as shown in FIG. 6. When this occurs, air will escape past stem 26 and pressurize the cell which surrounds that particular valve. The cumulative effect of the air in all of the cells will be to raise the support bag slightly off the ground. The air in each cell will be constantly flowing past walls 20, thereby supplying a lubricating film of air between the walls and the surface over which the vehicle is traveling. The only part of the vehicle in actual contact with the surface over which it is traveling will be heads 24 of valves 22.

When the vehicle approaches an obstacle, additional valves 22 will be opened where the bag contacts the obstacle. Thus a lubricating film of air will be provided over that part of the bag where the obstacle contacts the bag. After a given cell has passed over the obstacle, its valve will be forced closed by air pressure within chamber 32 and no further air will flow through that particular valve. Thus the bag provides lubricating air only where it is needed, and does not waste air where it is not needed.

Since the amount of air that can pass through the holes in the bag is limited, the air required for operation of the vehicle will fluctuate between narrow limits. This means that the size of the air supply fan required can be determined fairly accurately, and the fan and its associated driving motor can be made the minimum size for a given application.

The air pressure within chamber 32 will fluctuate over only narrow limits, since the air flow required will also fluctuate only over narrow limits. This means that a complicated pressure regulating system will not be needed on the vehicle, thereby decreasing the weight of the vehicle.

FIGS. 7, 8 and 9 show alternative reed valve configurations. In FIG. 7, ground contacting member 36 is attached to a flexible reed 38. When reed 38 is deflected by ground contacting member 36, air flows past it only on one side as shown by the arrow.

FIG. 8 shows a reed valve wherein the ground contacting member has a ball 40 in it. Ball 40 rolls along the surface rather than scraping along the surface as in the other valve configurations. This serves to reduce the wear on the ground contacting member.

FIG. 9 shows a valve for use in vehicles designed to travel over water. In this valve configuration, the ground contacting member is replaced by a member 42 which floats on water. The material of member 42 may be a syntatic foam or any other type of foam or other light-weight material which floats. Floating member 42 must be of sufficient size to open the valve against the pressure of the air in chamber 32, hence its density and size will be a function of the air pressure in chamber 32 and the size of the hole in the bag.

It will be obvious to those skilled in the art that walls 20 and any of the valve configurations shown in FIGS. 6–9 can be placed on the skirt of a conventional air cushion vehicle. When so placed, they would serve to reduce friction of the skirt over an obstruction in the manner of the configurations shown in FIGS. 2 and 5 by supplying a lubricating film of air between the skirt and the obstruction.

Obviously many modifications and variations of the present invention are possible in light of the above teachings. It is therefore to be understood that within the scope of the appended claims the invention may be practiced otherwise than as specifically described.

What is claimed is:

1. In an air cushion vehicle which travels on a cushion of air which is enclosed by a flexible cushion-enclosing member, the improvement comprising:
   means for reducing the frictional drag on the vehicle as it traverses an obstacle, said means for reducing frictional drag comprising a plurality of valves having operating elements for opening and closing said valves which release lubricating fluid upon contact with an obstacle, said valves being located on the surface of the member which encloses the air cushion on which the vehicle travels, the operating elements of said valves projecting beyond said cushion-enclosing member in the direction of travel of the vehicle so that said operating elements contact the obstacle before said cushion-enclosing member contacts the obstacle.

2. An air cushion vehicle as in claim 1 wherein said valves have a rotatable ball as their obstacle contacting member.

3. An air cushion vehicle as in claim 1 wherein said valves are operated by a member which floats on water.

4. An air cushion vehicle as in claim 1 wherein each valve is surrounded by walls which form a cell on said surface.

5. An air cushion vehicle as in claim 4 wherein said valve is a poppet valve.

6. An air cushion vehicle as in claim 4 wherein said valve is a reed valve.

* * * * *